US008972080B2

(12) United States Patent
Shida et al.

(10) Patent No.: US 8,972,080 B2
(45) Date of Patent: Mar. 3, 2015

(54) TRAFFIC CONTROL SYSTEM, VEHICLE CONTROL SYSTEM, TRAFFIC REGULATION SYSTEM, AND TRAFFIC CONTROL METHOD

(75) Inventors: Mitsuhisa Shida, Fuji (JP); Makoto Aso, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 62 days.

(21) Appl. No.: 13/697,269

(22) PCT Filed: Jul. 19, 2011

(86) PCT No.: PCT/IB2011/001666
§ 371 (c)(1),
(2), (4) Date: Nov. 9, 2012

(87) PCT Pub. No.: WO2012/014033
PCT Pub. Date: Feb. 2, 2012

(65) Prior Publication Data
US 2013/0124012 A1 May 16, 2013

(30) Foreign Application Priority Data
Jul. 29, 2010 (JP) ................................ 2010-171129

(51) Int. Cl.
*G05D 1/00* (2006.01)
*G05D 3/00* (2006.01)
(Continued)

(52) U.S. Cl.
CPC ................ *G08G 1/00* (2013.01); *G08G 1/0104* (2013.01); *G08G 1/08* (2013.01); *G08G 1/164* (2013.01)
USPC ............... 701/2; 701/117; 701/118; 701/119; 701/121; 701/414

(58) Field of Classification Search
CPC ......... G08G 1/0104; G08G 1/00; G08G 1/01; G08G 1/22; G08G 1/04; G08G 1/096716; G08G 1/075; G08G 1/07; G01C 21/36; G01C 21/30; G01C 21/00; G01C 21/32; G01C 21/26; G01C 21/343; Y02T 10/82; Y02T 10/7005; Y02T 30/30; Y02T 30/40; B60W 2550/302; B60W 10/18; B60W 10/06; B60W 10/10
USPC ............... 701/2, 23, 301, 415, 55, 65, 36, 45; 180/2.1, 167, 170, 65.21
See application file for complete search history.

(56) References Cited

U.S. PATENT DOCUMENTS 5,257,194 A 10/1993 Sakita
5,444,442 A 8/1995 Sadakata et al.
(Continued)

FOREIGN PATENT DOCUMENTS

JP A-05-006498 1/1993
JP A-11-039599 2/1999
(Continued)

OTHER PUBLICATIONS

Japanese Office Action dated Mar. 6, 2012 for Japanese Patent Application No. 2010-171129 (with partial translation).

*Primary Examiner* — Calvin Cheung
*Assistant Examiner* — Luis A Martinez Borrero
(74) *Attorney, Agent, or Firm* — Oliff PLC

(57) ABSTRACT

A traffic control system sets a target value related to a travel state based on a correlation between a vehicle travel speed and a traffic volume, and controls multiple vehicles (CS) on a road in accordance with the target value as a common target value. The target value can be set based on a predicted traffic volume at a region (103) that is ahead of, in a vehicle travel direction, the multiple vehicles on the road. For example, the traffic control system sets, as the target value, a target speed or a target value of a parameter related to an inter-vehicle distance.

11 Claims, 7 Drawing Sheets

(51) Int. Cl.

| | |
|---|---|
| ***G06F 7/00*** | (2006.01) |
| ***G06F 17/00*** | (2006.01) |
| ***G08G 1/00*** | (2006.01) |
| ***G08G 1/01*** | (2006.01) |
| ***G08G 1/08*** | (2006.01) |
| ***G08G 1/16*** | (2006.01) |

(56) References Cited

U.S. PATENT DOCUMENTS

| | | | | |
|---|---|---|---|---|
| 5,778,332 | A | 7/1998 | Chang et al. | |
| 2006/0082472 | A1* | 4/2006 | Adachi et al. | 340/995.13 |
| 2006/0142933 | A1* | 6/2006 | Feng | 701/117 |
| 2006/0161335 | A1* | 7/2006 | Beinhaker | 701/200 |
| 2006/0195250 | A1* | 8/2006 | Kawaguchi | 701/117 |
| 2006/0229792 | A1 | 10/2006 | Kawazoe et al. | |
| 2008/0012726 | A1* | 1/2008 | Publicover | 340/932 |
| 2008/0270014 | A1* | 10/2008 | Nagase et al. | 701/118 |
| 2008/0319639 | A1* | 12/2008 | Yamane | 701/118 |
| 2010/0060482 | A1 | 3/2010 | Emam et al. | |
| 2010/0063715 | A1* | 3/2010 | Wynter et al. | 701/118 |
| 2010/0070253 | A1* | 3/2010 | Hirata et al. | 703/8 |
| 2010/0082227 | A1* | 4/2010 | Posner et al. | 701/118 |
| 2010/0214126 | A1* | 8/2010 | Publicover | 340/907 |
| 2010/0256835 | A1* | 10/2010 | Mudalige | 701/2 |
| 2011/0098916 | A1* | 4/2011 | Jang | 701/201 |
| 2011/0160987 | A1* | 6/2011 | Wu et al. | 701/117 |
| 2012/0010797 | A1* | 1/2012 | Luo et al. | 701/70 |
| 2012/0123660 | A1 | 5/2012 | Kagawa et al. | |

FOREIGN PATENT DOCUMENTS

| | | | | |
|---|---|---|---|---|
| JP | A-11-086197 | | 3/1999 | |
| JP | 2003248891 A | * | 9/2003 | G08G 1/00 |
| JP | A-2008-059094 | | 3/2008 | |
| JP | A-2009-140007 | | 6/2009 | |
| JP | A-2009-151562 | | 7/2009 | |
| JP | A-2010-036862 | | 2/2010 | |
| WO | WO 2011/013202 A1 | | 2/2011 | |

* cited by examiner

TRAFFIC CONTROL SYSTEM, VEHICLE CONTROL SYSTEM, TRAFFIC REGULATION SYSTEM, AND TRAFFIC CONTROL METHOD

FIELD OF THE INVENTION

The invention relates to a traffic control system, a vehicle control system, a traffic regulation system, and a traffic control method.

DESCRIPTION OF RELATED ART

Various technologies for guiding vehicles are known. Japanese Patent Application Publication No. 05-006498 describes a technology related to a merging vehicle control system that guides the vehicles traveling on a main road and those traveling on a merging road to smoothly travel to the merging point at which the merging road merges into the main road, by calculating the traffic flows at the main road and merging road, and then controlling, using a lighting control device, the lighting patterns of a main road vehicle guidance light and a merging road vehicle guidance light, which are installed along the main road and the merging road, respectively, in accordance with the calculated traffic flows. Japanese Patent Application Publication No. 05-006498 describes that, with the technology described above, the vehicle flow at the merging point can be smoothened, and thus traffic congestions can be prevented or relieved positively, and efficiently.

However, there still is some room for consideration as to prevention of traffic congestions on roads. For example, there are demands for preventing traffic congestions also at locations other than merging points.

SUMMARY OF THE INVENTION

The invention provides a traffic control system, a vehicle control system, a traffic regulation system, and a traffic control method, which prevent traffic congestions.

The first aspect of the invention relates to a traffic control system that sets a target value related to a travel state based on a correlation between a vehicle travel speed and a traffic volume, and that controls multiple vehicles on a road in accordance with the target value as a common target value.

The traffic control system described above may be such that a traffic volume at the road is detected or estimated and the target value is set based on the detected or estimated traffic volume.

The traffic control system described above may be such that a predicted traffic volume at a vehicle travel direction ahead region that is ahead of, in a vehicle travel direction, the multiple vehicles on the road is determined and the target value is set based on the predicted traffic volume.

The traffic control system described above may be such that the multiple vehicles are controlled in accordance with the common target value in a vehicle travel direction behind region that is behind, in the vehicle travel direction, a merging point at which a merging road merges into the road. The predicted traffic volume may be a predicted traffic volume at a region that is ahead of, in the vehicle travel direction, the merging point on the road. A traffic volume at the vehicle travel direction behind region and a traffic volume at the merging road may be detected or estimated, and the predicted traffic volume may be determined based on the detected or estimated traffic volumes.

The traffic control system described above may be such that a target speed is set as the target value based on the correlation such that a volume of traffic that is allowed to flow at the target speed in the vehicle travel direction ahead region is equal to or larger than the predicted traffic volume.

The traffic control system described above may be such that a target value of a parameter related to an inter-vehicle distance between a subject vehicle and a vehicle traveling immediately ahead of the subject vehicle is set as the target value, and predetermined vehicles that are capable of executing predetermined control are controlled in accordance with the target value. The predetermined control may be control which obtains, by communication, information on deceleration of another vehicle that is one of the predetermined vehicles and is traveling ahead of the subject vehicle that is another of the predetermined vehicles, and which decelerates the subject vehicle in conjunction with deceleration of the other vehicle based on the information related to the deceleration. The target value may be set such that a volume of traffic that is allowed to flow in the vehicle travel direction ahead region is equal to or larger than the predicted traffic volume if the predetermined vehicles are controlled in accordance with the target value.

The traffic control system described above may be such that the target value is set based on an environmental travel condition ahead of, in the vehicle travel direction, the multiple vehicles on the road.

The second aspect of the invention relates to a vehicle control system that sets or obtains a target value related to a travel state, which is commonly used also by another vehicle and is based on a correlation between a vehicle travel speed and a traffic volume, and that executes vehicle travel control in accordance with the target value.

The third aspect of the invention relates to a traffic regulation system that sets a target value related to a travel state based on a correlation between a vehicle travel speed and a traffic volume, and that transmits the target value, which is a common target value, to multiple vehicles that are on a road and are each capable of controlling its own travel in accordance with the target value.

A fourth aspect of the invention relates to a traffic control method that includes setting a target value related to a travel state based on a correlation between a vehicle travel speed and a traffic volume; and controlling a first vehicle and a second vehicle on a road in accordance with the target value as a common target value.

According to the traffic control system and the traffic control method according to the invention, a target value related to a travel state is set based on a correlation between a vehicle travel speed and a traffic volume, and multiple vehicles on a road are controlled in accordance with the common target value. Therefore, the traffic control system according to the invention can prevent traffic congestions.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Traffic control systems, vehicle control systems, and traffic regulation systems according to example embodiments of the invention will be described in detail with reference to the drawings. It is to be noted that the invention is not limited to any of the example embodiments and the structural elements in the following example embodiments may include structural elements that persons skilled in the art can easily employ or structural elements substantially identical to them.

First Example Embodiment

Figure 1:
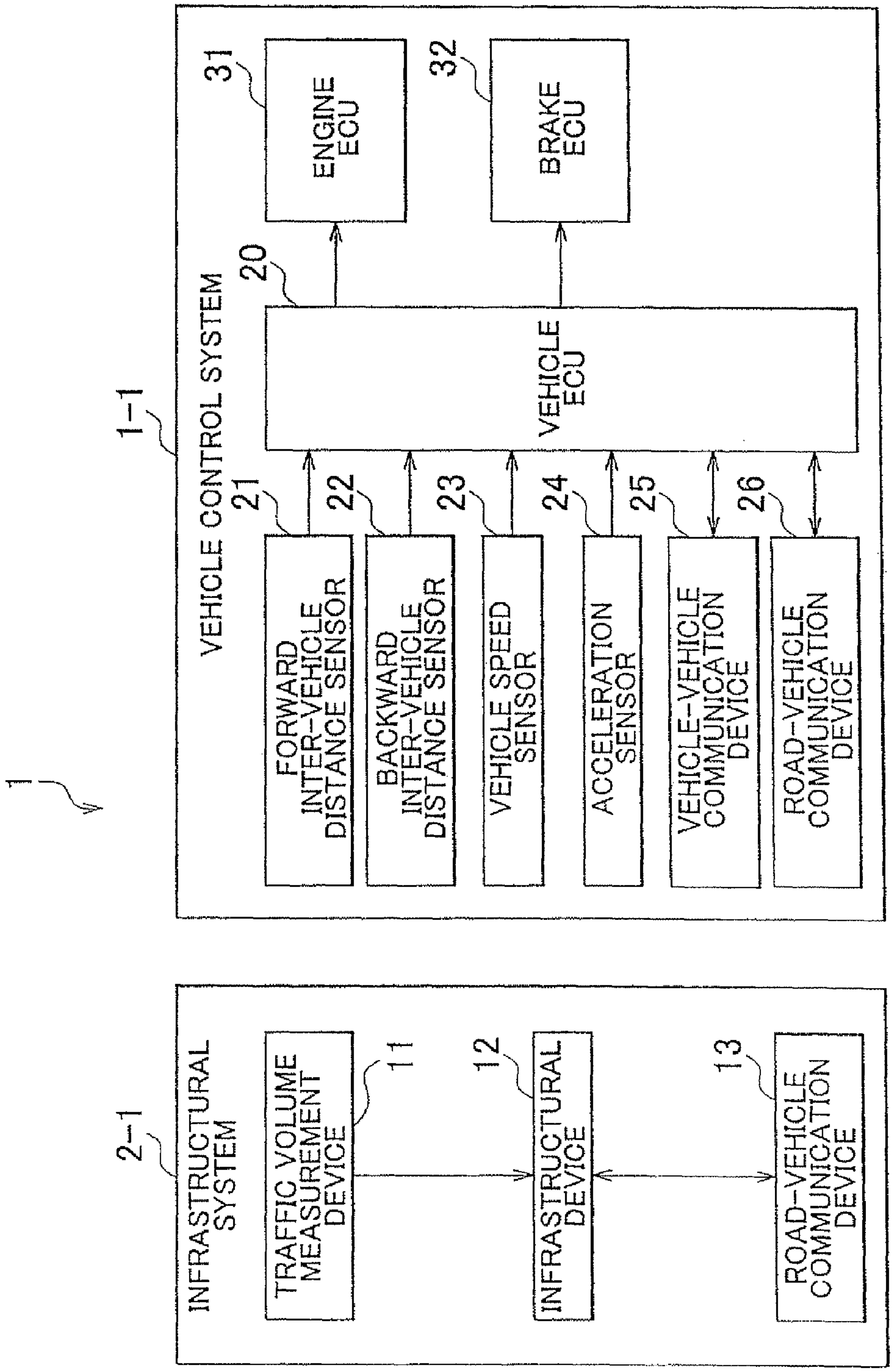
FIG. 1 is a view showing a traffic control system of an example embodiment.

The first example embodiment will be described with reference to FIGS. 1 to 6. The first example embodiment relates to a traffic control system, a vehicle control system, and a traffic regulation system. FIG. 1 is a view showing the traffic control system of the first example embodiment.

In the first example embodiment, a target speed factoring in the entire traffic capacity is set, and vehicle control is executed based on the target speed. In a case where there is a merging road that merges into a main road, the target speed of the vehicles on the main road is set such that the traffic capacity on the downstream side of the merging point is equal to or larger than the sum of the traffic volume at the main road and that at the merging road. Thus, executing the speed control factoring in the entire traffic capacity, it is possible to prevent the traffic on the road from entering a critical state or a congestion state. Note that "traffic capacity" will be described later.

A traffic control system 1 of the first example embodiment includes a vehicle control system 1-1 and an infrastructural system 2-1. The vehicle control system 1-1 includes a vehicle ECU 20, a forward inter-vehicle distance sensor 21, a backward inter-vehicle distance sensor 22, a vehicle speed sensor 23, an acceleration sensor 24, a vehicle-vehicle communication device 25, a road-vehicle communication device 26, an engine ECU 31, and a brake ECU 32.

The vehicle ECU 20 is an electronic control unit that executes the overall control of the vehicle, and it includes, for example, a computer having a CPU (Central Processing Unit), a ROM (Read Only Memory), a RAM (Random Access Memory), and so on. The forward inter-vehicle distance sensor 21 is capable of detecting the distance between the subject vehicle and the preceding vehicle, and the backward inter-vehicle distance sensor 22 is capable of detecting the distance between, the subject vehicle and the vehicle traveling right behind it. Various sensors, including laser radar sensors and millimeter wave radar sensors, may be used as the forward inter-vehicle distance sensor 21 and the backward inter-vehicle distance sensor 22. The forward inter-vehicle distance sensor 21 is provided at the front side of the vehicle, while the backward inter-vehicle distance sensor 22 is provided at the rear side of the vehicle. The forward inter-vehicle distance sensor 21 and the backward inter-vehicle distance sensor 22 are connected to the vehicle ECU 20, and the signals indicative of the inter-vehicle distances detected by the forward inter-vehicle distance sensor 21 and the backward inter-vehicle distance sensor 22 are output to the vehicle ECU 20.

The vehicle speed sensor 23 is capable of detecting the travel speed of the subject vehicle. The vehicle speed sensor 23 may be, for example, a sensor that detects the speed of the vehicle wheels. The vehicle speed sensor 23 is connected to the vehicle ECU 20, and the signals indicative of the vehicle speed detected by the vehicle speed sensor 23 are output to the vehicle ECU 20.

The acceleration sensor 24 is capable of detecting the acceleration of the subject vehicle in its longitudinal direction. The acceleration sensor 24 is connected to the vehicle ECU 20, and the signals indicative of the acceleration detected by the acceleration sensor 24 are output to the vehicle ECU 20.

The vehicle-vehicle communication device 25 is used for communication between vehicles. The vehicle ECU 20 is capable of providing and receiving various information including travel state information, via the vehicle-vehicle communication device 25, to and from another vehicle having the vehicle-vehicle communication device 25. In the following descriptions, a vehicle including the vehicle control system 1-1 will be referred to as "system-equipped vehicle".

The road-vehicle communication device 26 is a communication device that is used for communication between the infrastructural system 2-1 and the vehicle control system 1-1.

The engine ECU 31 is capable of controlling the engine in accordance with the commands from the vehicle ECU 20. In the first example embodiment, the engine ECU 31 controls the output of the engine through intake control, fuel injection control, ignition control, etc., based on the target acceleration output from the vehicle ECU 20.

The brake ECU 32 is capable of controlling the brakes in accordance with the commands from the vehicle ECU 20. In the first example embodiment, the brake ECU 32 controls the braking force of the vehicle by activating the brake actuators in accordance with the target acceleration output from the vehicle ECU 20.

The vehicle control system 1-1 is capable of executing Adaptive Cruise Control (ACC control). For example, the ACC control includes follow-drive control that detects the preceding vehicle using a radar, or the like, and controls the vehicle to follow the preceding vehicle while maintaining a constant distance (inter-vehicle distance) from it, and constant speed travel control that controls the vehicle to travel at a constant speed.

The constant speed travel control automatically controls the vehicle speed in accordance with the target vehicle speed that is "set vehicle speed" input by the driver. In a case where the preceding vehicle is not detected during execution of the ACC control, for example, the vehicle control system 1-1 controls the traveling of the vehicle such that the vehicle keeps running at the set vehicle speed. In a case where the preceding vehicle is detected and the preceding vehicle is traveling at a speed lower than the set vehicle speed, the vehicle control system 1-1 executes the follow-drive control such that the distance to the preceding vehicle remains equal to a predetermined distance that has been input in advance. The vehicle ECU 20 controls the acceleration of the vehicle such that the distance to the preceding vehicle does not become shorter than the predetermined distance. Thus, when the speed of the preceding vehicle is lower than the set vehicle speed, the vehicle control system 1-1 maintains a given inter-vehicle distance by decelerating the subject vehicle.

Figure 2:
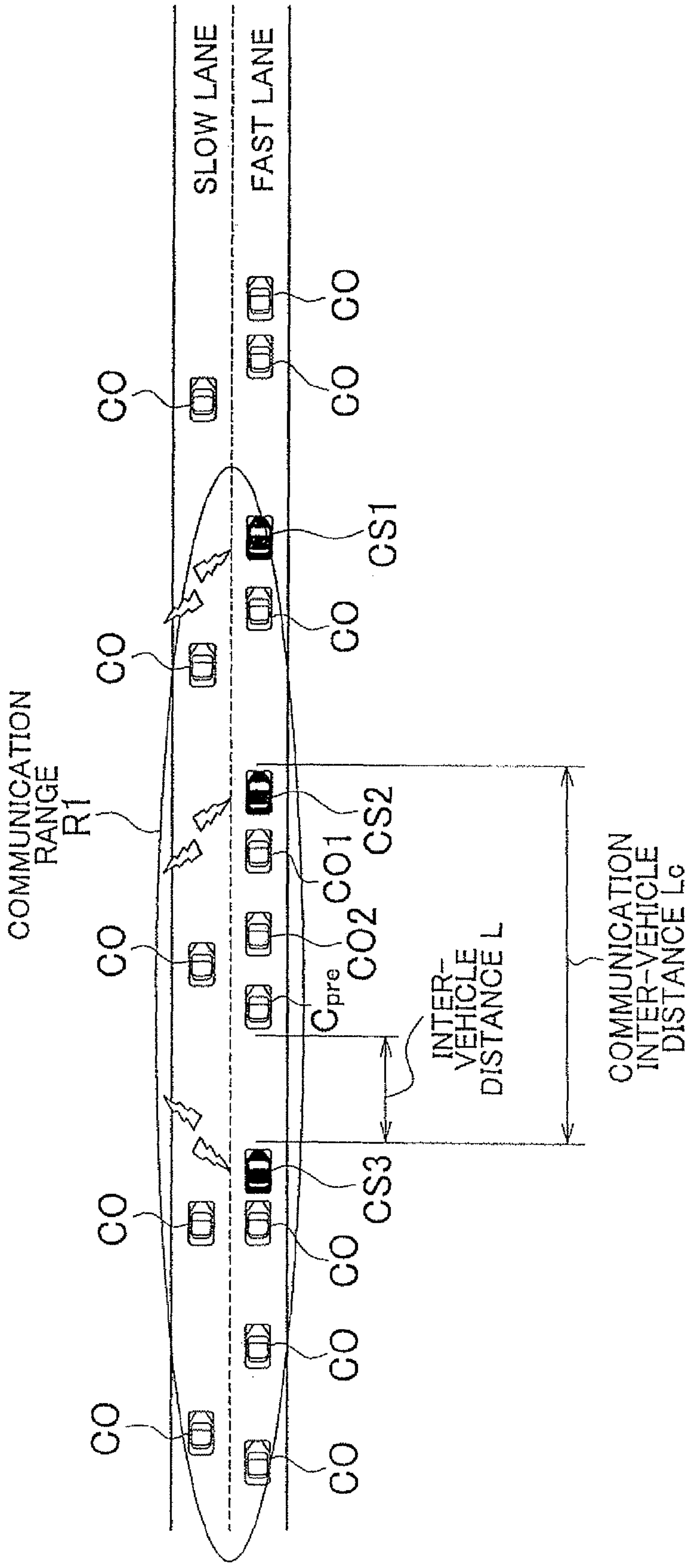
FIG. 2 is a view illustrating follow-drive control and cooperative deceleration control of system-equipped vehicles.

Further, the vehicle control system 1-1 is capable of executing cooperative deceleration control that decelerates the subject vehicle in conjunction with deceleration of a system-equipped vehicle (predetermined ahead vehicle) traveling ahead of the subject vehicle. FIG. 2 is a view illustrating the follow-drive control and cooperative deceleration control of system-equipped vehicles. FIG. 2 shows a situation where "system-equipped vehicles CS" and "ordinary vehicles CO" that do not have the vehicle control system 1-1 are traveling on a freeway (e.g., expressway). FIG. 2 shows a communication inter-vehicle distance Lc that is the distance between the system-equipped vehicles CS.

The three system-equipped vehicles CS1, CS2, and CS3 are traveling on the fast lane. The system-equipped vehicles CS1, CS2, and CS3 transmit information related to their travel states, etc., to each other via vehicle-vehicle communication.

By vehicle-vehicle communication, various information, such as identification information, travel information, target control amount information, driver operation information, vehicle specification information, communication protocol information, and environmental information, can be transmitted to other vehicles. The identification information includes the identification of the vehicle that transmits the identification information and the identification of the vehicle group to which that vehicle belongs. The travel information is measured value information related to the travel state of the subject vehicle, including the present position, travel direction (azimuth), travel speed, travel acceleration, jerk, inter-vehicle distance, inter-vehicle time, etc. The target control amount information specifies various target values, input values, control command values, etc., that various in-vehicle systems use to control the vehicle, and the target control amount information includes the target speed, target acceleration, target jerk, target direction (azimuth), target inter-vehicle time, and target inter-vehicle distance. It is to be noted that "inter-vehicle time" represents the period of time from when the vehicle passes a given point to when the next vehicle passes it.

The driver operation information specifies the amounts of input operations by the driver and the information input by the driver, and the driver operation information includes the acceleration operation amount, brake operation amount (the force on the brake pedal and the travel of the brake pedal), turn indicator operation (whether the turn indicator is presently operated and in which direction it is operated), steering angle, brake light state (ON or OFF), etc. The vehicle specification information includes the vehicle weight, maximum brake force, maximum acceleration, maximum jerk, and reaction rates and time constants of various actuators (brakes, accelerator, shift, etc.). The communication protocol information is based on predetermined rules, and it includes flags indicating greeting information and transfer information. The environmental information is information related to the environmental travel conditions, and it includes road surface information (e.g., friction coefficient (μ), gradient, temperature, surface state (wet, dry, or frozen), surface type (paved or unpaved)), wind velocity information, wind direction information, etc.

The vehicle control system 1-1 is capable of executing the follow-drive control with respect to a preceding vehicle $C_{pre}$ traveling immediately ahead of the subject vehicle CS3 and the cooperative deceleration control that reduces the vehicle speed in cooperation with the system-equipped vehicles CS1 and CS2 traveling ahead of the subject vehicle CS3. For example, the follow-drive control and the cooperative deceleration control may each be executed as one of the modes of the ACC control. During the follow-drive control, the vehicle ECU 20 controls the acceleration of the subject vehicle CS3 such that an inter-vehicle distance L between the subject vehicle CS3 and the preceding vehicle $C_{pre}$ equals a target inter-vehicle distance $L_t$, which is predetermined. Further, the vehicle ECU 20 controls the acceleration of the subject vehicle CS3 so as to reduce the difference between the speed of the subject vehicle CS3 and those of the system-equipped vehicles CS1 and CS2 traveling ahead of the subject vehicle CS3. For example, the vehicle ECU 20 calculates a target subject vehicle acceleration $a_t$, which is the target acceleration of the subject vehicle CS3, using the equation 1 below.

$$a_t=k_{vc1}(V_{c1}-V)+k_{vc2}(V_{c2}-V)+\ldots+k_{vcN}(V_{cN}-V)+k_{aRelV}(V_{pre}-V)+k_{aS}(L_t-L) \quad \text{(Equation 1)}$$

In the equation 1, V represents the speed of the subject vehicle, $V_{pre}$ represents the speed of the preceding vehicle, L represents the inter-vehicle distance, $k_{aRelV}$ is a feedback gain for the difference between the speed of the subject vehicle and the speed of the preceding vehicle, $k_{aS}$ is a feedback gain for the error in the inter-vehicle distance to the preceding vehicle, $k_{vc1}$ to $k_{vcN}$ are feedback gains for the differences between the speed of the subject vehicle and the speeds of the respective system-equipped vehicles ahead, $k_{vc1}$ to $k_{vcN}$ being, for example, positive values, and $V_{c1}$ to $V_{cN}$ represent the speeds of the respective system-equipped vehicles ahead. In the first example embodiment, speeds $V_{ci}$ (i=1, 2 to N) of the respective system-equipped vehicles ahead of the subject vehicle may be regarded as the information related to deceleration of the respective system-equipped vehicles ahead of the subject vehicle. In the situation illustrated in FIG. 2, because two system-equipped vehicles are traveling ahead of the subject vehicle CS3 within a communication range R1, 2 is assigned to N in the equation 1. The engine ECU 31 and the brake ECU 32 control the acceleration of the subject vehicle CS3 in accordance with the target subject vehicle acceleration $a_t$.

By decelerating the subject vehicle CS3 in conjunction with the deceleration of the system-equipped vehicles CS1 and CS2 traveling ahead as described above, deceleration shockwaves can be interrupted by the system-equipped vehicles. When a vehicle decelerates on a road, the deceleration can successively propagate to the following vehicles. At this time, a deceleration shockwave may occur which propagates to the following vehicles while the amount of deceleration is getting larger and larger. For example, in a case where a deceleration shockwave propagates from ahead of the system-equipped vehicle CS2, the deceleration amount of an ordinary vehicle CO1 right behind the system-equipped vehicle CS2 is larger than that of the system-equipped vehicle CS2, and the deceleration amount of an ordinary vehicle CO2 behind the ordinary vehicle CO1 is even larger. For example, a deceleration shockwave occurs due to the driver starting to decelerate the subject vehicle after noticing the motion of the preceding vehicle that is decelerating, resulting in a decrease in the distance between the subject vehicle and the preceding vehicle.

Each system-equipped vehicle of the first example embodiment is capable of executing the cooperative deceleration control that decelerates the subject vehicle in conjunction with the deceleration of the other system-equipped vehicle traveling ahead of the subject vehicle. Thus, the subject vehicle starts decelerating before the deceleration of the preceding vehicle $C_{pre}$ propagates to the subject vehicle, and therefore the inter-vehicle distance L to the preceding vehicle $C_{pre}$ can be kept sufficient. Thus, the system-equipped vehicles are capable of absorbing and interrupting deceleration propagations, thus preventing or relieving traffic congestions.

Further, the system-equipped vehicles of the first example embodiment are capable of traveling tandem. It is to be noted that "tandem travel" refers to a situation where multiple system-equipped vehicles are traveling tandem, that is, they are traveling in a row in the same lane with no ordinary vehicle traveling between them. During such tandem travel, the follow-drive control, which controls the subject vehicle to follow the preceding system-equipped vehicle while maintaining the target inter-vehicle distance to it, is executed such that the acceleration of the subject vehicle is controlled based on the information on other system-equipped vehicles, which is obtained via vehicle-vehicle communication. In the first example embodiment, in contrast to the ACC control that executes the follow-drive control with respect the preceding vehicle based on the result of detection of the inter-vehicle distance to the preceding vehicle, the ACC control that executes the follow-drive control with respect to the preceding system-equipped vehicle based on the information on other vehicles in the tandem, which is obtained by communication, as well as based on the inter-vehicle distance, will be referred to as "communicative ACC control".

Figure 3:
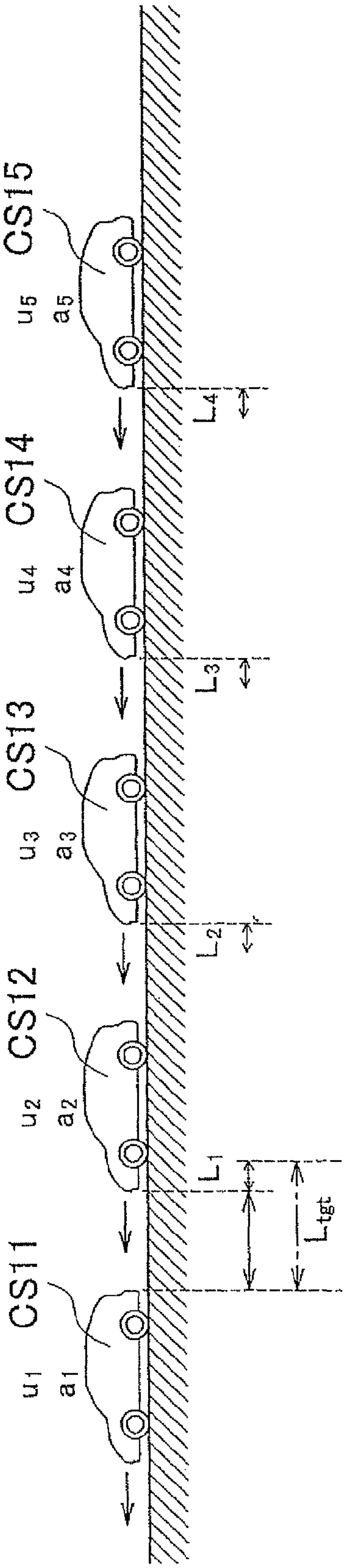
FIG. 3 is a view showing a tandem travel of five system-equipped vehicles.

FIG. 3 illustrates a situation where five system-equipped vehicles travel tandem. These system-equipped vehicles traveling tandem are denoted by CS11, CS12, CS13, CS14, and CS15, beginning at the front. Each system-equipped vehicle transmits, using the vehicle-vehicle communication device 25, the vehicle specification information, travel state information, and acceleration command value information of its own to other vehicles, and obtains the vehicle specification information, travel state information, and acceleration command value information of each of the other vehicles. That is, the vehicle control systems 1-1 of all the vehicles traveling tandem share the vehicle specification information, travel state information, and acceleration command value information of each of them.

In the following descriptions, the acceleration, speed, and acceleration command value of the system-equipped vehicle CS that is the nth (n=1, 2, 3, 4, 5) from the front of the tandem will be denoted by $a_n$, $V_n$, and $u_n$, respectively. Further, the inter-vehicle error between the nth system-equipped vehicle CS and the (n+1)th system-equipped vehicle CS will be denoted by $L_n$. Note that "inter-vehicle error" represents the error in the present inter-vehicle distance L with respect to a target inter-vehicle distance $L_{tgt}$. Further, the system-equipped vehicle CS11 traveling at the front of the tandem will be referred to as "front vehicle" where necessary, and the system-equipped vehicles traveling behind the front vehicle CS11 in the tandem will be referred to as "following vehicles" where necessary.

In the tandem travel control, the travel states of the four following vehicles CS12 to CS15 are controlled in accordance with the travel state of the front vehicle CS11. The front vehicle CS11 may either be manually driven by the driver or driven under cruise control, such as the ACC control. The vehicle control systems 1-1 control the travel states of the respective following vehicles CS12 to CS15 such that they follow the front vehicle CS11.

In the tandem travel control, the acceleration command values $u_2$ to $u_5$ for the respective following vehicles CS12 to CS15 are set using the travel state information, etc. of all the vehicles CS11 to CS15, as well as the information on the respective following vehicles CS12 to CS15. Employing optimum control (LQ control), the tandem travel control sets the acceleration command values $u_2$ to $u_5$ using the accelerations $a_1$ to $a_5$, inter-vehicle errors $L_1$ to $L_4$, inter-vehicle relative speeds $L'_1$ to $L'_4$, and acceleration command values $u_1$ to $u_5$ for all the vehicles CS11 to CS15 in the tandem. It is to be noted that "inter-vehicle relative speed" represents the difference between the speed $V_n$ of the system-equipped vehicle CS that is the nth from the front and the speed $V_{n+1}$ of the system-equipped vehicle CS that is the (n+1)th from the front, however, because it is also the time derivative of the inter-vehicle error $L_n$, it will be denoted by $dL_n/dt$ or $L'_n$.

The vehicle control systems 1-1 of the respective following vehicles CS12 to CS15 set their acceleration command values $u_2$ to $u_5$ using, for example, the following algorithm.

With regard to the tandem travel control, using the acceleration command values $u_2$ to $u_5$ as control inputs and using the accelerations $a_1$ to $a_5$, inter-vehicle errors $L_1$ to $L_4$, and inter-vehicle relative speeds $L'_1$ to $L'_4$ as state quantities, the tandem travel of the vehicles CS11 to CS15 is expressed by the following equation 2, which is a state space equation. The vehicle control system 1-1 applies the optimum control to the system expressed by the equation (2), $$\dot{x}=Ax+B_c u_c+B_0 u_0+B_w u_w \quad \text{(Equation 2)}$$

In the above equation, x is a state vector ($x=(a_1, L_1, L'_1, a_2, L_2, L'_2, a_3, L_3, L'_3, a_4, L_4, L'_4, a_5)^T$), $u_c$ is an acceleration command value vector ($u_c=(u_2, u_3, u_4, u_5)^T$), $u_0$ is an acceleration command value of the front vehicle; and $u_w$ represents external disturbances including road gradients and winds.

A, $B_c$, $B_0$, and $B_W$ in the equation 2 are matrixes that are appropriately determined based on various conditions, such as the vehicle specification information of the vehicles CS11 to CS15. Further, in the equation 2, a dot is put above "x" to indicate that it is a time derivative, however, the time derivative will alternatively be denoted by x', or the like, in the following descriptions.

The acceleration command value vector $u_c$ is expressed by the equation 3 below, using a feedback gain matrix K.

$$u_c=B_{ff}u_0+Kx \quad \text{(Equation 3)}$$

wherein $$B_{ff}=\begin{bmatrix} l \\ l \\ l \\ l \end{bmatrix}.$$

The feedback gain matrix K for tandem travel of five vehicles has 13 columns and 4 rows.

The following equation 4 expresses an evaluation function J used when executing the optimum control on the system expressed by the equation 2 above.

$$J=\int\left\{\varepsilon_L(L_1^2+L_2^2+L_3^2+L_4^2)+\varepsilon_{dL}\left(\frac{dL_1^2}{dt}+\frac{dL_2^2}{dt}+\frac{dL_3^2}{dt}+\frac{dL_4^2}{dt}\right)+\varepsilon_u(U_2^2+u_3^2+u_4^2+u_5^2)\right\}dt \quad \text{(Equation 4)}$$

In the equation 4, for weighting, weighting coefficients $\epsilon_L$, $\epsilon_{dL}$, and $\epsilon_u$ are attached, respectively, to the term for the inter-vehicle errors $L_1$ to $L_4$, the term for the inter-vehicle relative speeds $L'_1$ to $L'_4$, and the term for the acceleration command values $u_2$ to $u_5$. More specifically, the relative priorities of three conditions of the tandem travel control, that is, the inter-vehicle distance steadiness, the inter-vehicle relative speed reduction, and the vehicle acceleration/deceleration reduction, are determined through the allocations to the weighting coefficients $\epsilon_L$, $\epsilon_{dL}$, and $\epsilon_u$ included in the evaluation function J.

The value of a feedback gain matrix $K_1$ that minimizes the result of the evaluation function J expressed by the equation 4 above is uniquely obtained when the sequence of the five vehicles CS11 to CS15 in the tandem is determined. When the feedback gain matrix $K_1$ is applied to the equation 3, the value of the acceleration command value vector $u_c$ that minimizes the result of the evaluation function J can be obtained by setting the acceleration command value $u_1$ for the front vehicle CS11 as a feedforward value and assigning the state vector x that is determined based on the information obtained from various sensors. That is, the sequence of the acceleration command values $u_2$ to $u_5$ is set to a sequence that minimizes the result of the evaluation function J.

The elements of the state vector x are obtained based on the information provided from various sensors in the respective vehicles CS11 to CS15. For example, the inter-vehicle relative speeds $L'_1$ to $L'_4$ are each calculated as the speed difference between two vehicles traveling tandem, based on the vehicle speed information obtained from the vehicle speed sensors 23 of the respective vehicles CS11 to CS15.

Next, the infrastructural system 2-1 will be described. The infrastructural system 2-1 is an infrastructural traffic system that is installed at a road. For example, the infrastructural system 2-1 is installed on a road or at a roadside. Referring to FIG. 1, the infrastructural system 2-1 includes a traffic volume measurement device 11, an infrastructural device 12, and a road-vehicle communication device 13. In the first example embodiment, the infrastructural system 2-1 functions as a traffic regulation system that sets a target value related to the travel state of each vehicle based on a correlation between the vehicle speed and the traffic volume and then transmits the target value, as a common target value, to multiple system-equipped vehicles traveling on the road and each capable of controlling its own travel in accordance with the target value.

The traffic volume measurement device 11 measures the traffic volume of the vehicles traveling on a road. More specifically, the traffic volume measurement device 11 is capable of detecting the number of the vehicles that pass a measurement point on the road in each unit duration and the speed at which each vehicle passes the measurement point.

The infrastructural device 12 sets a target value related to the travel state of each vehicle based on the result of detection by the traffic volume measurement device 11. The infrastructural device 12 transmits the set target value to the respective system-equipped vehicles via the road-vehicle communication device 13.

The road-vehicle communication device 13 receives the signals transmitted from the road-vehicle communication device 26 of each vehicle control system 1-1. The road-vehicle communication device 26 of each vehicle control system 1-1 receives the signals transmitted from the road-vehicle communication device 13. In this way, interactive communications are performed between the respective vehicle control systems 1-1 and the infrastructural system 2-1.

Figure 4:
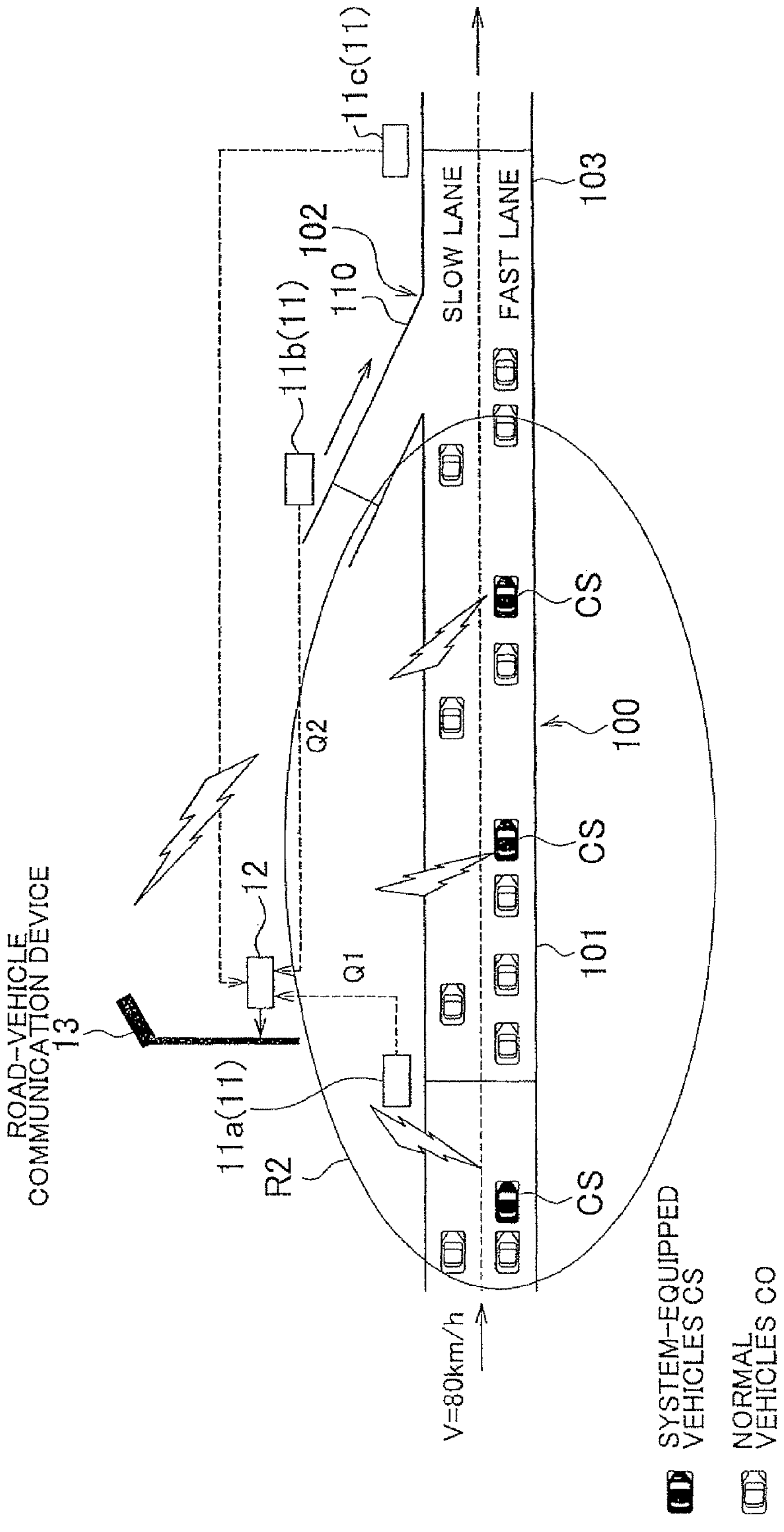
FIG. 4 is a view illustrating traffic control by the traffic control system of the example embodiment.

FIG. 4 illustrates the traffic control executed by the traffic control system 1 of the first example embodiment. FIG. 4 shows a merging point on a freeway (e.g., expressway). In FIG. 4, a main road 100 of the freeway and a merging road 110 that merges into the main road 100 are shown. The main road 100 is a two-lane road consisting of a fast lane and a slow lane. The merging road 110 is a one-lane road merging into the main road 100 at a merging point 102. Further, a communication range R2 of the road-vehicle communication device 13 is shown in FIG. 4.

An upstream traffic volume measurement device 11*a*, which serves as the traffic volume measurement device 11, is installed at an upstream main road 101 that is upstream of, in the vehicle travel direction, the merging point 102 of the main road 100 (note that "upstream" refers to the backward side in the vehicle travel direction). The upstream traffic volume measurement device 11*a* counts the number of the vehicles traveling on the upstream main road 101. The upstream traffic volume measurement device 11*a* measures the traffic volume at each lane of the upstream main road 101. A merging road traffic volume measurement device 11*b*, which serves as the traffic volume measurement device 11, is installed at the merging road 110. The merging road traffic volume measurement device 11*b* measures the traffic volume at the merging road 110. A downstream traffic volume measurement device 11*c*, which serves as the traffic volume measurement device 11, is installed at a downstream main road 103 that is downstream of the merging point 102 of the main road 100 (note that "downstream" refers to the forward side in the vehicle travel direction). The downstream traffic volume measurement device 11*e* counts the number of the vehicles traveling on the downstream main road 103. The downstream traffic volume measurement device 11*c* measures the traffic volume at each lane of the downstream main road 103. The signals indicative of the traffic volumes measured by the traffic volume measurement devices 11*a*, 11*b*, and 11*c*, respectively, are output to the infrastructural device 12.

Figure 5:
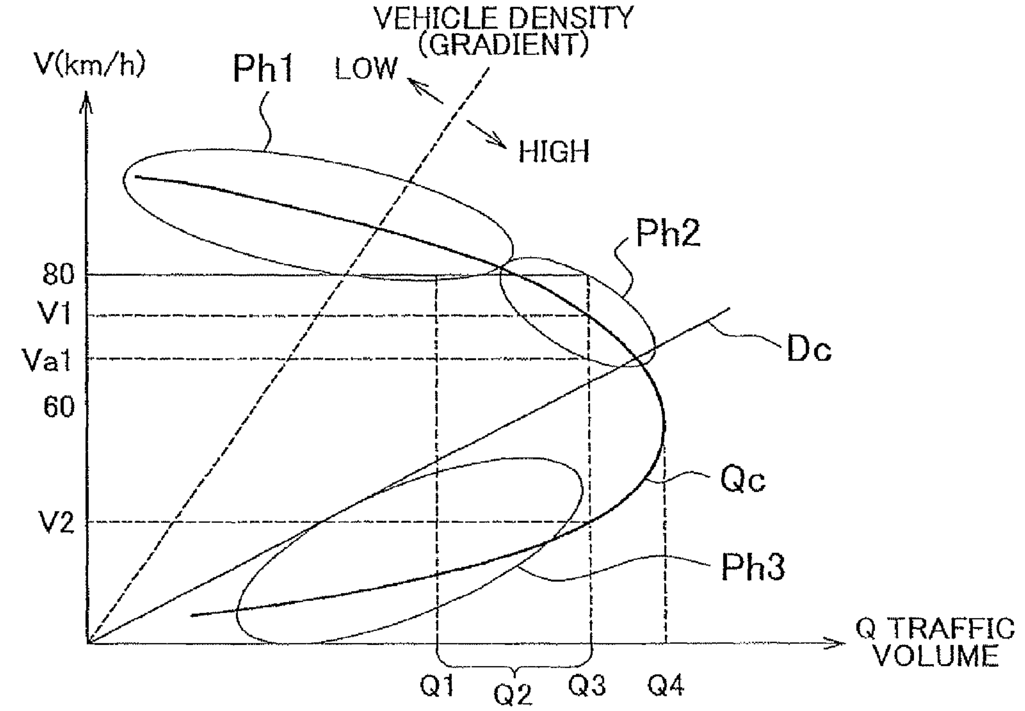
FIG. 5 illustrates a correlation between a travel speed and a traffic volume.
Figure 6:
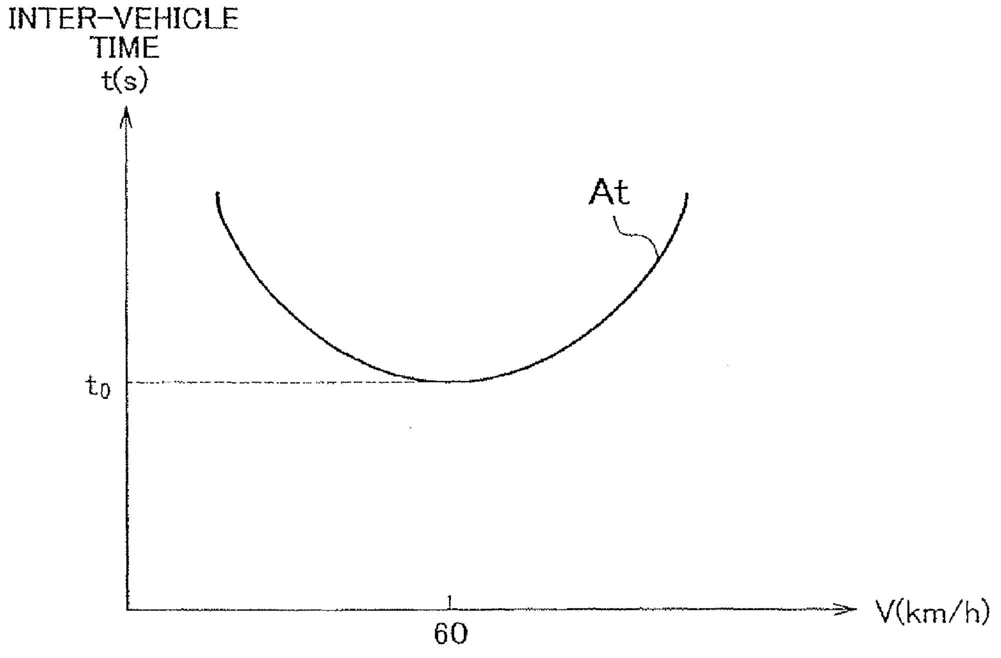
FIG. 6 illustrates a human inter-vehicle time characteristic.

The infrastructural device 12 sets a target value related to the travel states of the vehicles traveling on the main road 100, based on the traffic volumes measured by the traffic volume measurement devices 11*a*, 11*b*, and 11*c*, respectively. In the following, how the infrastructural device 12 sets the target value will be described with reference to FIGS. 5 and 6. FIG. 5 is a graph illustrating a correlation between the travel speed and the traffic volume, and FIG. 6 is a graph illustrating an inter-vehicle time characteristic of human beings.

In FIG. 5, the horizontal axis represents a traffic volume Q (the number of vehicles/(time·lane)), and the vertical axis represents a travel speed V (km/h). FIG. 5 illustrates the relation between the traffic volume Q and the speed V, which is found when the respective vehicles are driven by the drivers. The gradient of the straight line running from the origin in FIG. 5 represents the density of the vehicles on the road. The vehicle density increases as the traffic volume Q increases and as the travel speed V decreases, while the vehicle density decreases as the traffic volume Q decreases and as the travel speed V increases. Further, a critical density Dc is shown in FIG. 5. When the vehicle density is higher than the critical density Dc, a traffic congestion is likely to occur.

A critical curve $Q_C$ is a curve representing the relation between the maximum volume of traffic that is allowed to flow (will hereinafter be referred to as "the maximum allowable traffic volume) and the speed in a case where the respective vehicles are driven by the drivers. That is, the traffic volume at the critical curve $Q_C$ represents the maximum allowable traffic volume at each travel speed, that is, the traffic capacity of the road.

The critical curve $Q_C$ corresponds to the inter-vehicle time characteristic of human beings. A curve At in FIG. 6 represents the average inter-vehicle time characteristic that is found when human beings drive vehicles at each travel speed V. Referring to FIG. 6, when the subject vehicle is traveling at approx. 60 km/h, the inter-vehicle time with respect to the preceding vehicle becomes a minimum value to. The inter-vehicle time increases as the travel speed increases from approx. 60 km/h, and as the travel speed decreases from approx. 60 km/h. The minimum value t0 is, for example, approx. 0.7 second. The density of the vehicles on the road, that is, the traffic volume corresponds to the inverse of the inter-vehicle time. That is, the shorter the inter-vehicle time, the larger the traffic volume. Referring to FIG. 5, the allowable traffic volume Q becomes a maximum traffic volume Q4 at approx. 60 km/h at which the inter-vehicle time corresponding to the human inter-vehicle time characteristic At is minimum.

A free phase Ph1, a critical phase Ph2, and a congestion phase Ph3 are shown in FIG. 5. The free phase Ph1 corresponds to a region where the vehicle density at the critical curve $Q_C$ is low. The critical phase Ph2 corresponds to a region where the vehicle density at the critical curve $Q_C$ is higher than those in the free phase Ph1 but the vehicle density is lower than the critical density Dc and those close to it. The congestion phase Ph3 corresponds to a region where the vehicle density at the critical curve $Q_C$ is higher than the critical density Dc.

When the vehicle density exceeds the critical density Dc, the traffic flow becomes unsteady, and therefore even a small change in the speed propagates in the direction opposite to the travel direction of the vehicles, while the change in the speed is becoming larger and larger (deceleration shockwave), causing a rapid shift to the congestion phase Ph1 (phase shift). For example, if the present point specified by the travel speed V and the traffic volume Q is in the critical phase Ph2, that is, when the traffic flow state is critical, the vehicle density can easily exceed the critical density Dc as external disturbances occur and as the traffic volume further increases, resulting in a shift to a congestion state. For example, when a sag, or the like, causes a shockwave that propagates deceleration to the following vehicles, it often brings about a phase shift to a congestion state.

The infrastructural device 12 sets a target value related to the travel state of the vehicles, based on the correlation between the vehicle travel speed and the traffic volume Q, which is shown in FIG. 5. In the first example embodiment, the infrastructural device 12 sets a target vehicle travel speed based on a traffic volume Q1 at the upstream main road 101, which is detected by the upstream traffic volume measurement device 11*a*, and a traffic volume Q2 at the merging road 110, which is detected by the merging road traffic volume measurement device 11*b*. A total traffic volume Q3, which is the sum of the traffic volume Q1 at the upstream main road 101 and the traffic volume Q2 at the merging road 110, is a prospective traffic volume at the downstream main road 103. More specifically, the total traffic volume Q3 is an expected traffic volume at the downstream main road 103 that is in a region ahead of, in the vehicle travel direction, the system-equipped vehicles traveling on the upstream main road 101 and also it is an expected traffic volume at a region ahead of, in the vehicle travel direction, the merging point 102. The infrastructural device 12 sets the target speed so as to prevent the downstream main road 103 from being congested, based on the total traffic volume Q3, that is, the traffic volume after the merging point.

For example, in a case where the travel speed at the upstream main road 101 is 80 km/h, as shown in FIG. 5, the total traffic volume Q3, which is the sum of the detected traffic volume Q1 at the upstream main road 101 and the detected traffic volume Q2 at the merging road 110, may become larger than the traffic volume at the critical curve $Q_C$ at 80 km/h, or it may be in the critical phase Ph2. Thus, the downstream main road 103 is expected to be congested if the vehicles on the main road 100 continue to travel at 80 km/h.

In such a case, the infrastructural device 12 sets the target speed to a speed that prevents traffic congestions at the total traffic volume Q3. For example, the target speed is set to a vehicle speed between the vehicle speed V1 at the point of intersection between the total traffic volume Q3 and the critical curve $Q_C$ and the vehicle speed V2 at another point of intersection between them, and it is possible to prevent a traffic congestion from occurring after the vehicles merge from the merging road 110 if the vehicles on the main road 100 travel at the target speed. The maximum allowable traffic volume (the traffic volume Q at the critical curve Qc) in the vehicle speed range from V2 to V1 is equal to or larger than the total traffic volume Q3. Therefore, setting the target speed to a speed in this vehicle speed range makes the allowable traffic volume at the downstream main road 103 equal to or larger than the total traffic volume Q3. The infrastructural device 12 sets the target speed within the vehicle speed range from V2 to V1. For example, the target speed can be set to a value that is in the vehicle speed range from V2 to V1 and is close to 80 km/h, which is the speed of the vehicles traveling on the upstream main road 101, e.g., the upper limit speed V1 of the same vehicle speed range or a vehicle speed that is in the same vehicle speed range and is close to the upper limit speed V1.

Meanwhile, the target speed may be set in a range that prevents a shift to the critical phase. For example, setting the target speed in a travel speed range that is lower than the travel speed range of the critical phase Ph2 (i.e., a travel speed range lower than a speed Va1) prevents occurrence of the critical state at the downstream main road 103. Further, the target speed may be set in a travel speed range higher than the travel speed range of the congestion phase Ph1, or in a travel speed range higher than the travel speed corresponding to the critical density Dc.

The infrastructural device 12 transmits the set target speed to the respective system-equipped vehicles CS on the upstream main road 101 via road-vehicle communication. Receiving the target speed from the infrastructural system 2-1, each vehicle ECU 20 sets the target acceleration so as to achieve the target speed and then outputs it to the engine ECU 31 and the brake ECU 32. In this way, the traffic control system 1 controls multiple system-equipped vehicles in accordance with the common target speed at the upstream main road 101 that is a region behind, in the vehicle travel direction, the merging point 102 at which the merging road 110 merges into the main road 100.

At this time, for example, in the system-equipped vehicle traveling under the ACC control, the vehicle ECU 20 changes the set speed for the ACC control from the speed input by the driver to the target speed obtained from the infrastructural system 2-1. As such, in each system-equipped vehicle, the travel control is executed in accordance with the target speed obtained from the infrastructural system 2-1, that is, multiple vehicles on the road are controlled in accordance with the common target value. In the following descriptions, the system-equipped vehicle travel control based on the target value set in accordance with the relation between the travel speed and the traffic volume Q will be referred to as "traffic volume regulation travel control". It is to be noted that each vehicle ECU 20 stores the speed input by the driver in a storage device and returns the set vehicle speed to the stored speed after the traffic volume regulation travel control is finished. For example, the traffic volume regulation travel control is finished when the system-equipped vehicle has started traveling on the downstream main road 103 after passing the merging point 102. It is to be noted that the traffic volume regulation travel control may be finished when the system-equipped vehicle has traveled a predetermined distance on the downstream main road 103 or when it has traveled for a predetermined period of time on the downstream main road 103.

In a case where the ACC control is being executed in the constant speed control mode at the start of the traffic volume regulation travel control, it is switched to constant speed control that uses the target speed obtained from the infrastructural system 2-1, in place of the set vehicle speed input by the driver. Further, in a case where the ACC control is being executed in the follow-drive control mode at the start of the traffic volume regulation travel control, the follow-drive control is continued in accordance with the travel speed at the start of the traffic volume regulation travel control, or it is switched to the deceleration control. That is, if the target speed is lower than the travel speed at the start of the traffic volume regulation travel control, the deceleration control is started, and if the target speed is equal to or higher than the travel speed at the start of the traffic volume regulation travel control, the follow-drive control is continued.

Further, in a case where the system-equipped vehicle is traveling under the communicative ACC control when it receives the target speed from the infrastructural system 2-1, the target speeds of the respective system-equipped vehicles in the same tandem are updated, through the communicative ACC control, to the target speed obtained from the infrastructural system 2-1. Each system-equipped vehicle may be structured to start, when it has obtained the target speed from the infrastructural system 2-1 during cruise control, such as the ACC control or the communicative ACC control, traveling under the traffic volume regulation travel control on the condition that the driver has permitted the system-equipped vehicle to travel under the traffic volume regulation travel control. Further, each system-equipped vehicle may be structured such that when it has obtained the target speed from the infrastructural system 2-1 while cruise control, such as the ACC control, was not being executed, the vehicle ECU 20 notifies the driver of the request for traveling under the traffic volume regulation travel control and causes the system-equipped vehicle to start traveling under the traffic volume regulation travel control on the condition that the driver has permitted the system-equipped vehicle to travel under the traffic volume regulation travel control.

In the traffic volume regulation travel control, the vehicle ECU 20 sets a target acceleration that achieves the target speed at least at the merging point 102. At this time, for example, the vehicle ECU 20 may set the target acceleration so as to achieve the target speed at a point a predetermined distance upstream of the merging point 102. The engine ECU 31 and the brake ECU 32 control the engine and the brakes, respectively, so as to achieve the target acceleration (including a negative acceleration (i.e., deceleration)). If the target speed is lower than the present travel speed of the system-equipped vehicle CS; the system-equipped vehicle CS is decelerated through the brake control, and the like, resulting in the following ordinary vehicles decelerating accordingly.

In a case where the multiple system-equipped vehicles CS are traveling dispersedly on the upstream main road 101, the system-equipped vehicles CS are decelerated at the respective points of the upstream main road 101 under the traffic volume regulation travel control. Thus, the respective system-equipped vehicles are cooperatively decelerated toward the common target speed, so that the distance between each system-equipped vehicle and the ordinary vehicle preceding the system-equipped vehicle increases. Therefore, even if deceleration propagates from one system-equipped vehicle CS, the deceleration propagation can be interrupted by the other system-equipped vehicle CS behind the one system equipped vehicle CS. As such, the traffic volume regulation travel control provides the advantage that it is possible to lower the average travel speed at the upstream main road 101 while preventing traffic congestions from being caused by deceleration shockwaves. According to the traffic volume regulation travel control, further, each system-equipped vehicle can maintain a moderate space in front of it, and this is expected to enable vehicles CS to smoothly merge into the main road 100 from the merging road 110.

In a case where multiple system-equipped vehicles CS are traveling tandem under the tandem travel control on the upstream main road 101, they concurrently start decelerating toward the target speed in the traffic volume regulation travel control. Since no deceleration propagation occurs between the system-equipped vehicles CS traveling tandem, they can be decelerated to the target speed while preventing deceleration propagation at the upstream main road 101. Further, in a case where multiple groups of system-equipped vehicles are traveling tandem, respectively, on the upstream main road 101, deceleration propagation from ahead can be interrupted by each vehicle group. Thus, deceleration shockwaves that may occur during the deceleration to the target speed under the traffic volume regulation travel control can be suppressed.

In a case where the system-equipped vehicles are decelerated to the target speed under the traffic volume regulation travel control, preferably, occurrence of deceleration shockwaves is prevented. For this reason, in the traffic volume regulation travel control, the point at which to start deceleration may be set so as to prevent occurrence of deceleration shockwaves. For example, an upper limit value of the deceleration under the traffic volume regulation travel control may be set, and the deceleration start point may be set such that vehicle speed is decreased at a deceleration lower than the upper limit value.

According to the traffic control system 1 of the first example embodiment, as described above, the infrastructural system 2-1 sets the target value so as to prevent the volume of traffic after the merging point from becoming as large as those causing the critical state or congestion state described above. That is, the speeds of the vehicles on the main road 100 are regulated in advance before the merging point by the system-equipped vehicles traveling under the traffic volume regulation travel control, thus preventing traffic congestions from occurring after the merging point.

While the target speed is set based on the road traffic volume detected by the traffic volume measurement device 11 in the first example embodiment, the target speed may alternatively be set based on an estimated traffic volume. For example, a traffic volume can be estimated based on the number of the vehicles surrounding the system-equipped vehicle. The number of such surrounding vehicles may be, for example, detected by detecting the number of the vehicles traveling nearby or their positions relative to the subject vehicle using a sensor, such as a radar, or by capturing images of the surroundings of the subject vehicle using a camera, or the like, and then detecting the number of the vehicles traveling nearby or their positions relative to the subject vehicle from the data of the captured images. The infrastructural system 2-1 is capable of estimating the traffic volume Q1 at the upstream main road 101 based on the number of surrounding vehicles that is obtained from each system-equipped vehicle via road-vehicle communication. The traffic volume Q2 at the merging road 110 may be estimated in the same manner. For example, a road-vehicle communication device that is capable of communicating with the system-equipped vehicles traveling on the merging road 110 may be used as the road-vehicle communication device 13 of the infrastructural system 2-1. In this case, the traffic volume Q2 at the merging road 110 may be estimated based on the information obtained from the system-equipped vehicles traveling on the merging road 110.

While the target speed is set based on the total traffic volume Q3 that is the sum of the traffic volume Q1 at the upstream main road 101 and the traffic volume Q2 at the merging road 110 in the first example embodiment, the parameter that can be used in setting the target speed is not limited to it. For example, the target speed may be set based on the traffic volume and speed detected by the downstream traffic volume measurement device 11*c*, in addition to the total traffic volume Q3. In this case, for example, the target speed may be corrected based on the difference between the target speed and the actual speed at the downstream main road 103, which is detected by the downstream traffic volume measurement device 11*c*.

Modification Example of First Example Embodiment

A modification example of the first example embodiment will be described. While the target speed used in the traffic volume regulation travel control is set by the infrastructural system 2-1 in the first example embodiment, the target speed may alternatively be set by the vehicle control system 1-1. In this case, for example, the infrastructural system 2-1 transmits the total traffic volume Q3, which is the sum of the traffic volume Q1 at the upstream main road 101 and the traffic volume Q2 at the merging road 110, to each system-equipped vehicle CS, and the vehicle ECU 20 of the vehicle control system 1-1, having received the transmitted total traffic volume Q3, sets the target speed.

Second Example Embodiment

Next, the second example embodiment will be described with reference to FIGS. 7 and 8. Note that the structural elements in the second example embodiment which have the same functions as those in the first example embodiment will be denoted by the same reference numerals, and their descriptions will not be repeated.

While the target speed is set based on the correlation between the travel speed and the traffic volume Q in the traffic volume regulation travel control in the first example embodiment, the set target value related to the travel state is not limited to it. For example, a target inter-vehicle value may be set instead of the target speed. Note that "target inter-vehicle value" is a target value of a parameter related to the distance between the subject vehicle and the preceding vehicle, and it is, for example, a target inter-vehicle distance or a target inter-vehicle time. In the second example embodiment, the target inter-vehicle time is set based on the correlation between the travel speed and the traffic volume Q, and the traffic volume regulation travel control executes the travel control of the system-equipped vehicles in accordance with the target inter-vehicle time. The system-equipped vehicles that can travel under the traffic volume regulation travel control are capable of executing, for example, the communicative ACC control. In the second example embodiment, that is, the allowable traffic volume at the road is increased by shortening the inter-vehicle time between the respective system-equipped vehicles traveling tandem.

Figure 7:
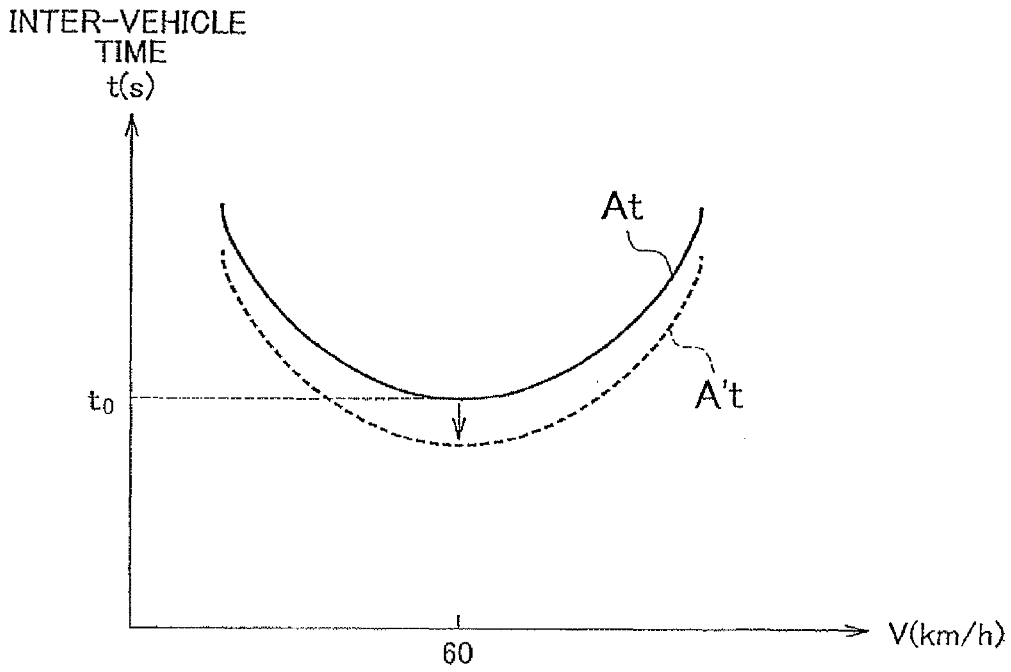
FIG. 7 illustrates an example of a target inter-vehicle time in a second example embodiment.

FIG. 7 is a graph illustrating an example of the target inter-vehicle time in the second example embodiment. In FIG. 7, A't represents an example of the target inter-vehicle time. At the same speed, the target inter-vehicle time A't is shorter than the inter-vehicle time corresponding to the human inter-vehicle time characteristic At. When executing the communicative ACC control, each system-equipped vehicle in the tandem observes the travel states of other system-equipped vehicles in the tandem by communication, and therefore the respective system-equipped vehicles can be accelerated and decelerated in conjunction with each other. For example, the communicative ACC control can decelerate the subject vehicle in conjunction with the system-equipped vehicle traveling ahead of the subject vehicle (predetermined ahead vehicle) based on the information related to deceleration of the same system-equipped vehicle. Thus, when executing the communicative ACC control, the tandem travel can be performed with an inter-vehicle time shorter than that corresponding to the human inter-vehicle time characteristic At. In the second example embodiment, the communicative ACC control is an example of "predetermined control", and the system-equipped vehicle that is capable of executing the communicative ACC control is an example of "predetermined vehicle".

Figure 8:
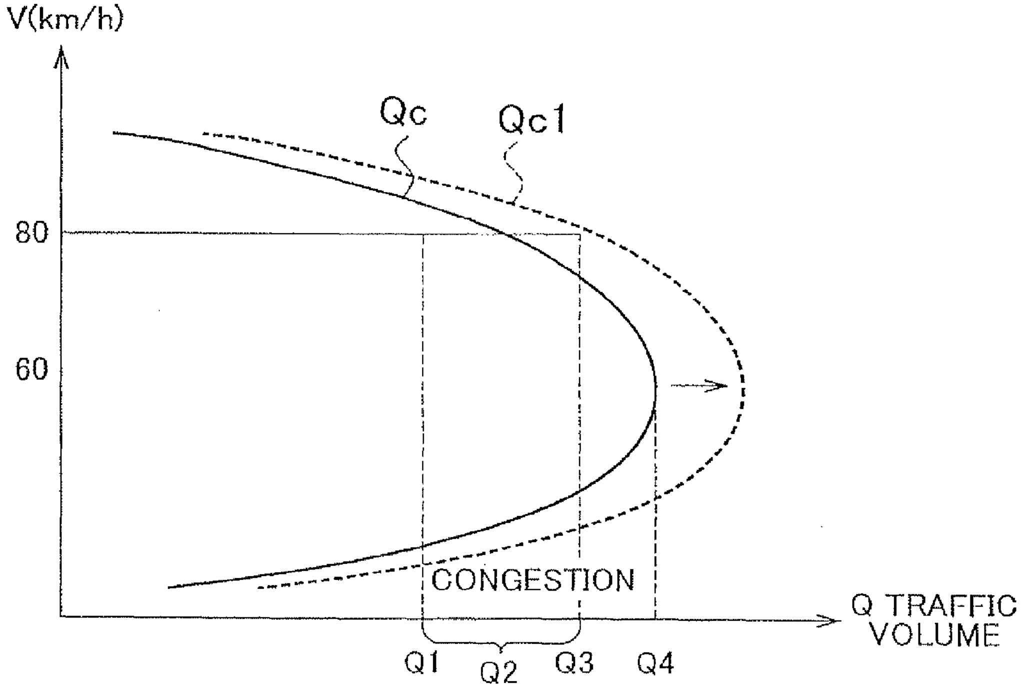
FIG. 8 is a graph illustrating how the target inter-vehicle time is set.

FIG. 8 is a graph illustrating how the target inter-vehicle time is set. The critical curve $Q_C$ shifts toward the larger vehicle volume side as the target inter-vehicle time for the system-equipped vehicles is set shorter than the inter-vehicle time corresponding to the human inter-vehicle time characteristic At. For example, a critical curve $Q_{C1}$ shown in FIG. 8 is obtained when the target inter-vehicle time is set, at each travel speed, to a time that is shorter than the inter-vehicle time corresponding to the human inter-vehicle time characteristic At by a constant length of time. More specifically, as the inter-vehicle time is shortened, the critical curve $Q_{C1}$ shifts toward the larger traffic volume side, with respect to the critical curve $Q_C$ corresponding to the human inter-vehicle time characteristic At.

The infrastructural device 12 sets, based on the total traffic volume Q3, the target inter-vehicle time such that the traffic capacity can cover the total traffic volume Q3. For example, in a case where the travel speed at the upstream main road 101, which is detected by the upstream traffic volume measurement device 11*a*, is 80 km/h and the total traffic volume Q3 is a value larger than the corresponding traffic volume on the critical curve $Q_C$, that is, a value on the traffic congestion side of the critical curve $Q_C$, the infrastructural device 12 sets the target inter-vehicle time shorter than the inter-vehicle time corresponding to the human inter-vehicle time characteristic At. For example, the infrastructural device 12 prestores therein a map defining a correlation between the control point specified by the target inter-vehicle time and the travel speed and the maximum allowable traffic volume. In this case, the infrastructural device 12 sets, referring to the map, the target inter-vehicle time such that the allowable traffic volume at the downstream main road 103 is equal to or larger than the total traffic volume Q3 if the system-equipped vehicles are controlled in accordance with the target inter-vehicle time. In other words, the target inter-vehicle time is calculated from the map such that the allowable traffic volume can be made equal to or larger than the total traffic volume Q3, without changing the travel speed at the downstream main road 103 relative to the travel speed at the upstream main road 101.

Meanwhile, the allowable traffic volume varies depending upon the ratio of the system-equipped vehicles that travel under the traffic volume regulation travel control to all the vehicles traveling on the main road 100. For this reason, the map described above may be formulated to use, as an additional parameter, a value related to the ratio of the system-equipped vehicles that travel under the traffic volume regulation travel control. Further, the infrastructural device 12 may be adapted to set the target inter-vehicle time to a constant value as long as the total traffic volume Q3 is larger than the corresponding traffic volume at the critical curve $Q_C$, regardless of how much the total traffic volume Q3 exceeds the corresponding traffic volume at the critical curve Qc. For example, the target inter-vehicle time may be set to a value obtained by subtracting a constant length of time from the inter-vehicle time corresponding to the human inter-vehicle time characteristic At. Further, the target inter-vehicle time may be set to the shortest of the selectable inter-vehicle times.

When receiving the target inter-vehicle time transmitted from the infrastructural system 2-1, each system-equipped vehicle changes the target inter-vehicle distance $L_{tgt}$ for the communicative ACC control to the inter-vehicle distance corresponding to the target inter-vehicle-time obtained from the infrastructural system 2-1. Thus, the traffic volume regulation travel control is executed in accordance with the target inter-vehicle time that is set based on the relation between the travel speed and the traffic volume Q, regulating the distances between the respective-system equipped vehicles traveling tandem to increase the allowable traffic volume, and thus preventing occurrence of traffic congestions after the merging point.

It is to be noted that the traffic volume regulation travel control based on the target inter-vehicle time may either be executed independently of the traffic volume regulation travel control in the first example embodiment, which is based on the target speed, or executed in combination with it. For example, in a case where it is impossible to make the traffic capacity large enough to cover the total traffic volume Q3 if only one of the traffic volume regulation travel control based on the target inter-vehicle time and the traffic volume regulation travel control based on the target speed is executed, they may be executed in combination. For example, if the total traffic volume Q3 is larger than a maximum traffic volume Q4, it is difficult to prevent occurrence of traffic congestions at the downstream main road 103 by executing only the traffic volume regulation travel control based on the target speed. In such a case, if the traffic volume regulation travel control in the second example embodiment, which is based on the target inter-vehicle time, is executed in addition to the traffic volume regulation travel control based on the target speed, traffic congestions can be prevented or relieved.

While the communicative ACC control is executed as an example of "predetermined control" and each system-equipped vehicle capable of executing the communicative ACC control, which is as an example of "predetermined vehicle", travels under the traffic volume regulation travel control based on the target inter-vehicle time in the second example embodiment, "predetermined control" and "predetermined vehicle" are not limited to them. For example, "predetermined control" may be the cooperative deceleration control. That is, the target volume regulation travel control based on the target inter-vehicle time may be executed using each vehicle capable of executing the cooperative deceleration control as "predetermined vehicle".

Third Example Embodiment

Figure 9:
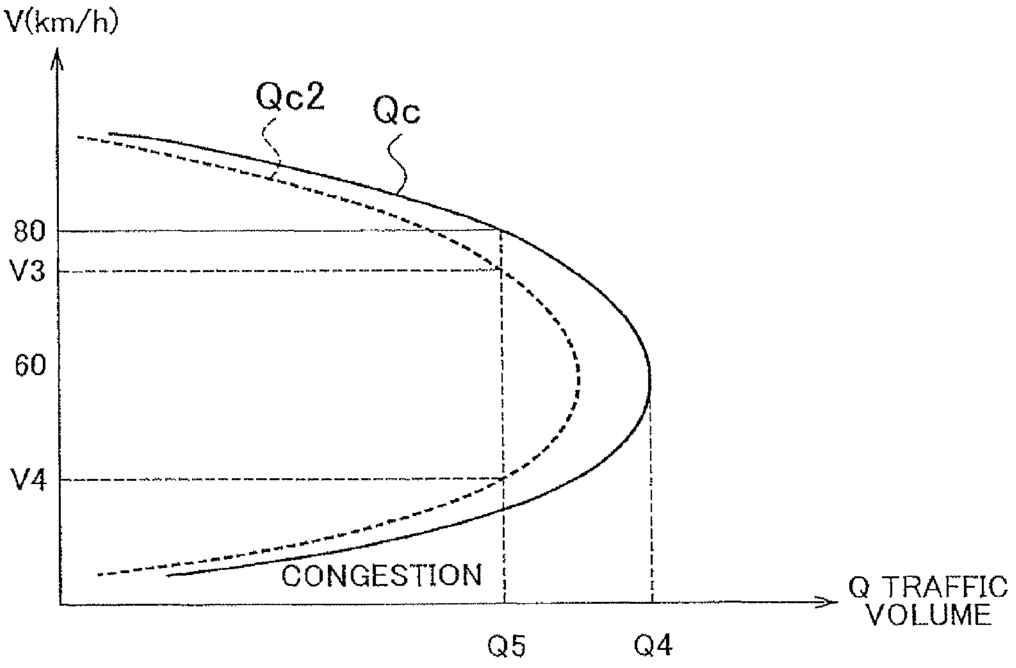
FIG. 9 is a view illustrating traffic volume regulation travel control in a third example embodiment.

Next, the third example embodiment will be described with reference to FIG. 9. The structural elements in the third example embodiment which have the same functions as those in the foregoing example embodiments will be denoted by the same reference numerals, and their descriptions will not be repeated.

The third example embodiment is different from the foregoing example embodiments in that the target speed is set based on information on the environmental travel conditions at the forward side in the vehicle travel direction, such as forward probe information. FIG. 9 is a graph illustrating the traffic volume regulation travel control in the third example embodiment.

For example, in a case where the environmental travel conditions in a region that is ahead, in the vehicle travel direction, of where the system-equipped vehicle, which is the control target of the traffic volume regulation travel control, is traveling include "rainfall", "small friction coefficient road surface", and the like, the traffic capacity of the region is relatively small. This is because each driver tends to maintain a longer distance to the preceding vehicle when it is raining or when traveling on a small friction coefficient road surface, for example. In FIG. 9, $Q_{C2}$ is the critical curve corresponding to a human inter-vehicle time characteristic in rain. The in-rain critical curve $Q_{C2}$ is on the smaller traffic volume side of the critical curve $Q_C$. That is, the traffic capacity is smaller in rain than in other environments. For example, even if traffic of a volume Q5 is allowed to flow at 80 km/h when it is not raining, the traffic volume Q5 can cause a traffic congestion in rain. The same applies to "small friction coefficient road surface". That is, the traffic capacity is small in a region where the road surface is, for example, wet or frozen having a small friction coefficient.

When an environmental travel condition that causes a decrease in the traffic capacity is detected ahead, the infrastructural device 12 sets the target speed in accordance with that environmental travel condition. For example, the infrastructural device 12 prestores therein critical curves for various environmental travel conditions, including the one for rainfalls (i.e., the critical curve $Q_{C2}$) and the one for small friction coefficient road surfaces, and sets the target speed using the critical curves and the traffic volume detected at the road. Information on such environmental travel conditions can be obtained from, for example, a probe car or a road state information distribution station. The probe car may either be a special-purpose vehicle for detecting environmental travel conditions or a vehicle capable of performing road-vehicle communication, such as the system-equipped vehicle.

For example, in a case where no rainfall is detected at the upstream side where the traffic volume measurement device 11 is installed while a rainfall is detected at the side downstream of the point at which the traffic volume measurement device 11 is installed, the infrastructural device 12 sets the target speed of the system-equipped vehicles traveling at the upstream side based on the traffic volume Q5 detected by the traffic volume measurement device 11 and the in-rain critical curve $Q_{C2}$. At this time, for example, the infrastructural device 12 sets the target speed to a speed equal to or higher than a speed V4 and equal to or lower than a speed V3. At each of the speed V4 and the speed V3, the traffic capacity does not exceed that at the in-rain critical curve $Q_{C2}$ as shown in FIG. 9. Then, the infrastructural device 12 transmits the set target speed to each system-equipped vehicle via road-vehicle communication. In this way, multiple system-equipped vehicles, which are the control targets of the traffic volume regulation travel control, execute travel control in accordance with the obtained target speed, regulating the road traffic flow and thus preventing occurrence of traffic congestions at the downstream side.

According to the above-described embodiments, it is possible to prevent occurrence of traffic congestion in a region that is ahead, in the vehicle travel direction, of multiple vehicles on the road, by changing at least one of the target speed and the target value of the parameter related to the inter-vehicle distance between the subject vehicle and the preceding vehicle traveling immediately ahead of the subject vehicle, as the common target value for the multiple vehicles on the road.

It is to be noted that environmental travel conditions that influence the traffic capacity are not limited to those related to the natural environment, such as rainfalls and small friction coefficient road surfaces. In other words, environmental travel conditions that influence the traffic capacity are not limited to those causing a change of the inter-vehicle time characteristic of the drivers. For example, a decrease in the number of lanes is also one of environmental travel conditions that influence the traffic capacity. That is, in a case where the number of lanes decreases, the traffic capacity on the downstream side of the point at which the number of lanes decreases is smaller than that on the upstream side of the same point. In such a case, the infrastructural device 12 sets the target speed so as to prevent occurrence of the critical state and congestion state at the road downstream of the point at which the number of lanes decreases, and then transmits the set target speed to each system-equipped vehicle. It is to be noted that “the point at which the number of lanes decreases” is not limited to points at which the number of the laid lanes of the road decreases, but it may also be a point at which the number of lanes decreases due to a temporary reason, such as road repairs, disabled vehicles, car accidents, and so on.

According to the third example embodiment, as described above, the traffic flow speed is regulated in advance to cope with the oncoming environmental travel conditions that may cause a decrease in the traffic capacity, and therefore it is possible to prevent occurrence of traffic congestions.

The features, structures, and so on, in each example embodiment may be combined with those of other example embodiments as needed.

Thus, the traffic control systems, vehicle control systems, and traffic regulation systems of the example embodiments of the invention can effectively prevent traffic congestions on roads.

The invention claimed is:

1. A traffic control system comprising:

an infrastructure device that sets a target vehicle travel speed based on a correlation between a vehicle travel speed and a traffic volume;

a road-vehicle communication device that transmits the target vehicle travel speed to multiple vehicles that are on a road and are each capable of controlling their travel in accordance with the target vehicle travel speed, the vehicles automatically controlling engine and brake systems of each of the vehicles based on the target vehicle travel speed; wherein the infrastructure device determines a predicted traffic volume at a vehicle travel direction ahead region that is located ahead of the multiple vehicles on the road in a vehicle travel direction; and the infrastructure device sets the target vehicle travel speed based on the predicted traffic volume such that a volume of traffic that flows at the target vehicle travel speed in the vehicle travel direction ahead region is equal to or larger than the predicted traffic volume and is within a travel speed range that avoids a shift in traffic volume to a critical phase at which traffic congestion may result from external disturbances causing the traffic volume to exceed a critical density.

2. The traffic control system according to claim 1, wherein the infrastructure device detects or estimates a traffic volume at the road and sets the target vehicle travel speed based on the detected or estimated traffic volume.

3. The traffic control system according to claim 1, wherein the infrastructure device controls the multiple vehicles in accordance with the target vehicle travel speed in a vehicle travel direction behind region that is located behind a merging point on the road in the vehicle travel direction, wherein the merging point is a point at which a merging road merges into the road, the predicted traffic volume is a predicted traffic volume at a region that is located ahead of the merging point on the road in the vehicle travel direction, the infrastructure device detects or estimates a traffic volume at the vehicle travel direction behind region and a traffic volume at the merging road, and the infrastructure device determines the predicted traffic volume based on the detected or estimated traffic volumes.

4. The traffic control system according to claim 1, wherein:

the traffic control system controls predetermined vehicles that are capable of executing a predetermined control, in accordance with the target vehicle travel speed, the predetermined control is a control which obtains, by communication, information on deceleration of another vehicle that is travelling ahead of a subject vehicle, and which decelerates the subject vehicle in conjunction with deceleration of the another vehicle based on the information related to the deceleration, the another vehicle and the subject vehicle are the predetermined vehicles, and the target vehicle travel speed is set such that the volume of traffic that flows in the vehicle travel direction ahead region is equal to or larger than the predicted traffic volume when the predetermined vehicles are controlled in accordance with the target vehicle travel speed.

5. The traffic control system according to claim 1, wherein the infrastructure device sets the target vehicle travel speed based on an environmental travel condition ahead of the multiple vehicles on the road in the vehicle travel direction.

6. The traffic control system according to claim 1, wherein the traffic control system controls predetermined vehicles that are capable of executing a predetermined control, the predetermined control is a control which obtains, by communication, information on deceleration of another vehicle that is one of the predetermined vehicles that is travelling ahead of a subject vehicle that is another of the predetermined vehicles, and which decelerates the subject vehicle in conjunction with deceleration of the another vehicle based on the information related to the deceleration, the infrastructure device also sets a target value of a parameter related to an inter-vehicle distance between the subject vehicle and a vehicle travelling immediately ahead of the subject vehicle, the traffic control system further comprises a traffic volume measurement device installed along the road and that measures the traffic volume of the vehicles travelling along the road, the infrastructure device includes a memory in which is stored a map defining a correlation between (i) a control point defined by a target inter-vehicle time and the vehicle travel speed and (ii) a maximum allowable traffic volume, the map also being formulated to use, as a parameter, a ratio of a number of the predetermined vehicles to a total number of vehicles on the road, and when the predicted traffic volume is larger than the maximum allowable traffic volume, the infrastructure device sets the parameter related to an inter-vehicle distance to a value that results in an inter-vehicle time that is smaller than an inter-vehicle time corresponding to a human inter-vehicle time characteristic.

7. A combination comprising:
a traffic control system that sets a target vehicle travel speed based on a correlation between a vehicle travel speed and a traffic volume and that transmits the target vehicle travel speed to multiple vehicles that are on a road and are each capable of controlling their travel in accordance with the target vehicle travel speed, the traffic control system determining a predicted traffic volume at a vehicle travel direction ahead region that is located ahead of the multiple vehicles on the road in a vehicle travel direction, and setting the target vehicle travel speed based on the predicted traffic volume such that a volume of traffic that flows at the target vehicle travel speed in the vehicle travel direction ahead region is equal to or larger than the predicted traffic volume and is within a travel speed range that avoids a shift in traffic volume to a critical phase at which traffic congestion may result from external disturbances causing the traffic volume to exceed a critical density; and
a vehicle control system comprising:
a communication device by which the vehicle control system of a predetermined vehicle receives the target vehicle travel speed from the traffic control system and sends information to the traffic control system; and
an electronic control unit that automatically controls an engine system and a brake system of the predetermined vehicle based on the received target vehicle travel speed.

8. A traffic control method implemented by a traffic control system, the method comprising:
setting, via an infrastructure system that is separate from vehicles, a target vehicle travel speed based on a correlation between a vehicle travel speed and a traffic volume; and
controlling a first vehicle and a second vehicle on a road in accordance with the target vehicle travel speed, the controlling being performed by electronic control units of each of the first and second vehicles, wherein
the target vehicle travel speed is transmitted by a transmitter of the infrastructure system to the first and second vehicles, which are each capable of controlling their own travel in accordance with the target vehicle travel speed via their respective electronic control units,
the electronic control units automatically control the first and second vehicles by controlling engine and brake systems of each of the vehicles based on the target vehicle travel speed, and
the infrastructure system sets the target vehicle travel speed based on a determined predicted traffic volume at a vehicle travel direction ahead region that is located ahead of the first and second vehicles on the road in a vehicle travel direction such that a volume of traffic that flows at the target vehicle travel speed in the vehicle travel direction ahead region is equal to or larger than the predicted traffic volume and is within a travel speed range that avoids a shift in traffic volume to a critical phase at which traffic congestion may result from external disturbances causing the traffic volume to exceed a critical density.

9. The traffic control method according to claim 8, wherein a merging road merges into the road,
the electronic control units control the first and second vehicles in accordance with the target vehicle travel speed in an upstream region that is located upstream of a merging point at which the merging road merges into the road,
the predicted traffic volume is a predicted traffic volume at a downstream region that is located downstream of the merging point on the road,
a traffic volume at the upstream region and a traffic volume at the merging road are detected or estimated, and
the predicted traffic volume is determined based on the detected or estimated traffic volumes.

10. The traffic control method according to claim 8, wherein the second vehicle is travelling immediately ahead of the first vehicle,
information on deceleration of the second vehicle is obtained by communication between the infrastructure system and the second vehicle,
the first vehicle is decelerated in conjunction with the deceleration of the second vehicle based on the information related to the deceleration of the second vehicle, and
the target vehicle travel speed is set such that the volume of traffic that flows in the vehicle travel direction ahead region is equal to or larger than the predicted traffic volume when the first and second vehicles are controlled in accordance with the target vehicle travel speed.

11. The traffic control method according to claim 8, further comprising:
controlling, via the infrastructure system, predetermined vehicles that are capable of executing a predetermined control, the predetermined control is a control which obtains, by communication, information on deceleration of another vehicle that is one of the predetermined vehicles that is travelling ahead of a subject vehicle that is another of the predetermined vehicles, and which decelerates the subject vehicle in conjunction with deceleration of the another vehicle based on the information related to the deceleration, the predetermined vehicles including the first and second vehicles,
setting, via the infrastructure system, a target value of a parameter related to an inter-vehicle distance between the subject vehicle and a vehicle travelling immediately ahead of the subject vehicle,
measuring, with a traffic volume measurement device installed along the road, the traffic volume of the vehicles travelling along the road,
storing, in a memory, a map defining a correlation between (i) a control point defined by a target inter-vehicle time and the vehicle travel speed and (ii) a maximum allowable traffic volume, the map also being formulated to use, as a parameter, a ratio of a number of the predetermined vehicles to a total number of vehicles on the road, and
when the predicted traffic volume is larger than the maximum allowable traffic volume, setting, via the infrastructure system, the parameter related to an inter-vehicle distance to a value that results in an inter-vehicle time that is smaller than an inter-vehicle time corresponding to a human inter-vehicle time characteristic.

* * * * *